O. L. M. HOOVER.
LIQUID OR GASEOUS FUEL BURNING FURNACE.
APPLICATION FILED MAY 19, 1920.

1,370,446.

Patented Mar. 1, 1921.
2 SHEETS—SHEET 1.

Inventor:
Orvill L. M. Hoover
By Percy H. Wood
Attorney.

O. L. M. HOOVER.
LIQUID OR GASEOUS FUEL BURNING FURNACE.
APPLICATION FILED MAY 19, 1920.
1,370,446.
Patented Mar. 1, 1921.
2 SHEETS—SHEET 2.
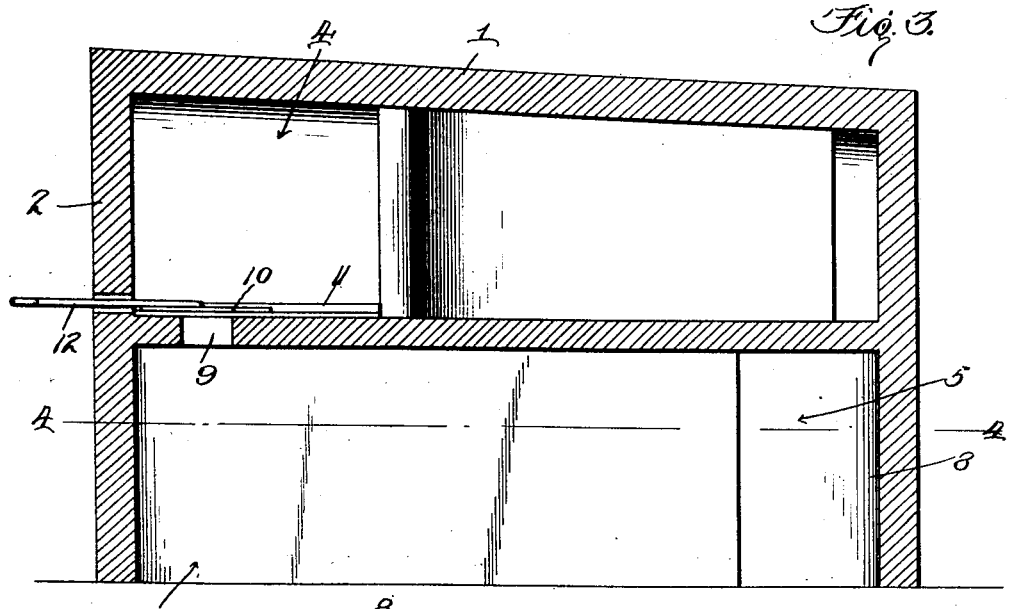
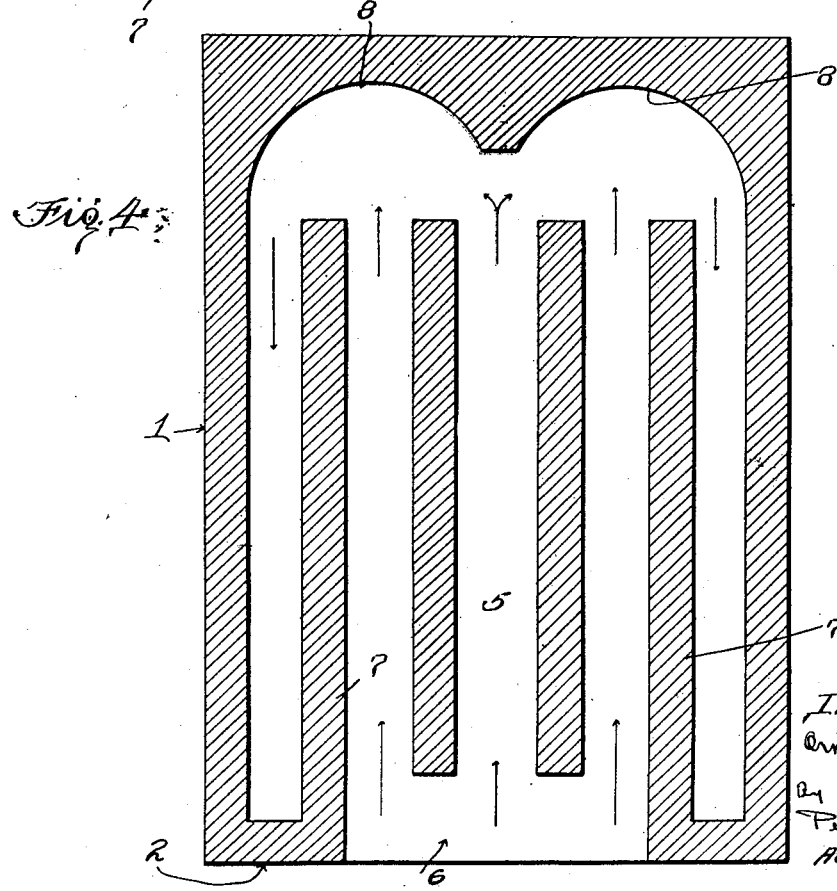

UNITED STATES PATENT OFFICE.

ORVILL LOCKWOOD MEAD HOOVER, OF DALLAS, TEXAS.

LIQUID OR GASEOUS FUEL BURNING FURNACE.

1,370,446.  Specification of Letters Patent.  Patented Mar. 1, 1921.

Application filed May 19, 1920. Serial No. 382,658.

*To all whom it may concern:*

Be it known that I, ORVILL LOCKWOOD MEAD HOOVER, a citizen of the United States of America, residing at Dallas, in the county of Dallas and State of Texas, have invented certain new and useful Improvements in Liquid or Gaseous Fuel Burning Furnaces, of which the following is a specification.

This invention relates to improvements in liquid or gaseous fuel burning furnaces, and it is the principal object of the invention to provide a novel means for preheating the air discharged or delivered into the combustion chamber of the furnace, whereby the heating efficiency of such furnace will be materially enhanced with but a minimum fuel consumption, and, further, to prevent any waste of heat generated by such furnace.

It is also an object of the invention to provide means for controlling the passage of the pre-heated air into the combustion chamber of the furnace to the desired nicety, in order that the air will proportionately correspond to the heat being generated in the furnace through the medium of its burner or burners.

Other objects will be in part obvious and in part pointed out hereinafter.

In order that the invention and its mode of application may be readily understood by persons skilled in the art, I have in the accompanying illustrative drawings, set out a preferred embodiment of the same.

In these drawings:

Fig. 3 is a vertical longitudinal section through the furnace;

Fig. 4 is a horizontal longitudinal section taken on the line 4—4 of Fig. 3;

Figure 1:
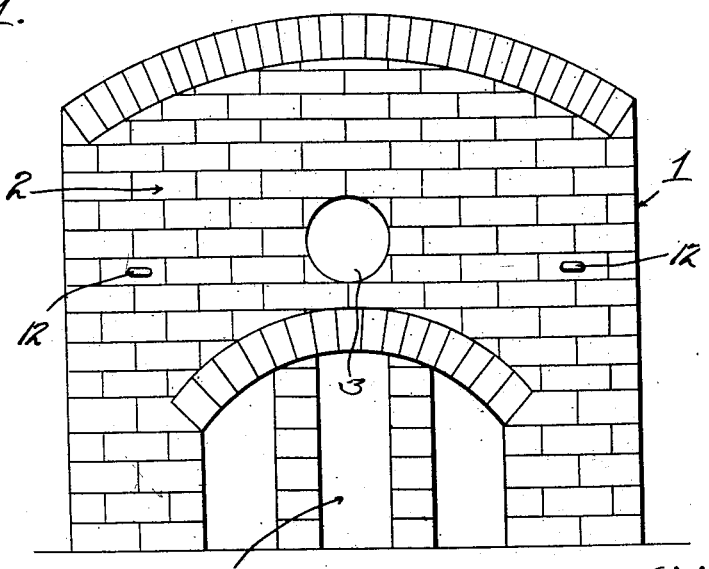
Figure 1 is a front elevation of the improved furnace.
Figure 2:
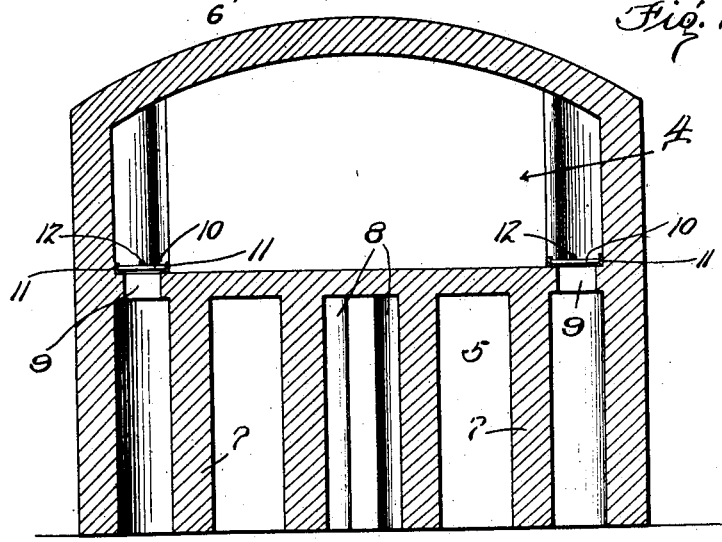
Fig. 2 is a vertical transverse section therethrough.
Figure 5:
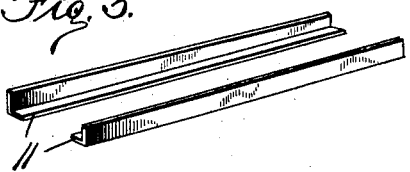
Fig. 5 is a detail in perspective showing the sliding mounting of one of the air controlling dampers.

Having more particular reference to the drawings, in connection with which like characters of reference will designate corresponding parts throughout the several views, the furnace to which my invention is adapted is of a liquid or gaseous fuel burning type, comprising a housing 1, having its forward end wall 2 formed with a burner receiving opening 3, through which the usual form of liquid or gaseous fuel burner (not shown), extends into the combustion chamber 4 of the furnace.

Below the combustion chamber 4, there is arranged the air-receiving pre-heating chamber of my improved furnace, such chamber being designated by the numeral 5, receiving its supply of air from a draft opening 6 formed in the lower end of the forward wall 2.

A plurality of spaced longitudinally disposed baffles are arranged in the pre-heating chamber 5, extending for its full length, as shown in Fig. 4, and serve as means for effecting thorough circulation of the air introduced into such chamber, in order that it will be brought to its maximum temperature before discharge into the combustion chamber 4 of the furnace, the intermediate baffles 7, obviously being of greater length than the outermost baffles to facilitate such circulation of the air during its heating process. Furthermore, the rear end wall of the furnace housing is formed with curved pockets 8, which serve to deflect the passage of air as between the various baffles 7, hence insuring pre-heating of the same.

Inlet ports 9 are formed in the bottom of the combustion chamber 4 and, as will be understood, communicate with one end of the air pre-heating chamber 5, thus, permitting such pre-heated air to flow from the chamber 5 upwardly into the combustion chamber 4, its passage into such combustion chamber being regulated by dampers 10, which are slidably mounted in angle metal guides 11 and adapted for movement to and from the ports 9, handles 12 being secured to such dampers and extending through openings in the forward wall 2 in the furnace housing 1 at a point convenient to an operator, whereby to facilitate adjustment thereof.

In operation of a furnace provided with my novel type of air pre-heating means it will be understood that cool or fresh air will pass into the pre-heating chamber 5, by way of the draft opening 6, and will be caused to contact with the heated bottom of the combustion chamber 4, due to its circulation thereby caused by the arrangement of baffles 7, the intermediate baffles 7 receiving the cool or fresh air and insuring the spreading or circulation of the same, between the ways afforded by the arrangement of the remaining baffles and the adjacent partitions of the furnace side walls 1. The air now heated to its maximum pre-heated temperature is passed between the ways afforded by the outermost baffles and the adjacent portions of the furnace side walls from which it is discharged by way of the ports 9, in the combustion chamber 4 of the furnace for effecting the final heating. The passage of air through the ports 9 into the combustion chamber, of course, may be controlled by regulation or adjustment by the dampers 10, such as conditions or preference may dictate.

The furnace which is of the air heating type, as is usual, is provided with air conveying ducts, (not shown), whereby the finally heated air may be conveyed to the desired points.

Manifestly, the construction shown is capable of considerable modification, and such modification as is within the scope of my claim, I consider within the spirit of my invention.

I claim:

A furnace of the character described comprising a housing divided into superposed combustion and air receiving chambers, having communicating openings at their forward ends at each side thereof, the bottom of the combustion chamber forming the top of the air receiving chamber, the forward wall of the housing having a centrally disposed opening therein communicating with the air receiving chamber, a longitudinal baffle at each side of the air receiving chamber to one side of said opening connected with and extending from the front wall of the furnace to a point adjacent the rear wall thereof, a plurality of central baffles between said first mentioned baffles and in alinement with said opening, the rear wall of the furnace being formed with vertically disposed curved air pockets whereby air passing rearwardly between said central baffles will be directed around and forwardly past said first mentioned baffles and upwardly through said communicating openings into said combustion chamber.

In testimony whereof I affix my signature in presence of two witnesses.

ORVILL LOCKWOOD MEAD HOOVER.

Witnesses:
 THOS. H. JACK,
 M. SIMPSON.